United States Patent [19]

Platt et al.

[11] 4,246,053

[45] Jan. 20, 1981

[54] WEB ROLLING METHOD AND APPARATUS

[75] Inventors: Louis Platt; Thomas S. Poteet, both of Seneca, S.C.

[73] Assignee: Phillips Petroleum Company, Bartlesville, Okla.

[21] Appl. No.: 98,445

[22] Filed: Nov. 29, 1979

Related U.S. Application Data

[62] Division of Ser. No. 964,328, Nov. 29, 1978, Pat. No. 4,201,620.

[51] Int. Cl.³ .......................... B31F 5/04; B65H 19/08
[52] U.S. Cl. .................................... 156/159; 156/251; 156/308.4; 156/504
[58] Field of Search ............ 156/157, 159, 251, 308.4, 156/502, 504; 242/58.3, 59

[56] References Cited

U.S. PATENT DOCUMENTS

| 3,298,890 | 1/1967 | Hellemans | 156/504 |
| 3,647,600 | 3/1972 | Vischulis et al. | 156/504 |
| 3,705,069 | 12/1972 | Elrod et al. | 156/159 |
| 3,841,944 | 10/1974 | Harris | 156/159 |
| 3,915,399 | 10/1975 | Kron et al. | 156/504 |
| 3,956,047 | 5/1976 | Johnson | 156/159 |
| 4,106,974 | 8/1978 | Hirsch | 156/504 |

Primary Examiner—Jerome W. Massie

[57] ABSTRACT

A method and apparatus are provided permitting shifting from rolling a thermoplastic web upon one roll to rolling the thermoplastic web upon another roll by overlapping the web connected to one roll and the web connected to the other roll, severing the overlapped webs, and forming a seam between the overlapped ends of the webs.

3 Claims, 12 Drawing Figures

WEB ROLLING METHOD AND APPARATUS

This application is a division of application Ser. No. 964,328, filed Nov. 29, 1978, now U.S. Pat. No. 4,201,620.

This invention relates to the handling of lengths of thermoplastic webs, such as for example sheets of thermoplastic resin or fabric webs containing thermoplastic fibers. In another aspect the present invention relates to a method and apparatus for handling lengths of thermoplastic webs which method allows shifting quickly and easily from rolling said web upon one roll to rolling said web upon another roll.

Generally, the production of thermoplastic webs is currently followed by rolling the product into rolls suitable for transporting the material to consumers. It often happens that along the lengths of the produced thermoplastic web there are areas of secondary quality. Accordingly, it has been found desirable to remove these secondary quality portions so that the product supplied to customers includes only web of desired specifications.

The removal of secondary quality web generally requires cutting across the web and rolling the secondary quality material upon a secondary roll. After primary quality material is again present the web is again cut across. When it is desired that the end product be a roll of a continuous length of the web, it then is necessary to seam the free ends of the primary quality material together before one can continue rolling the primary quality material onto a primary roll.

It has generally not been feasible to effect removal of secondary quality material directly as it is produced because prior to this invention the time required for the above-described operations was excessive since it required that the operations be performed separated from the production line. This required excessive labor as well as time and required many manual steps to complete the operations.

Accordingly, generally as material has been produced it has all been first rolled upon a production roll. After that roll was full, the roll would be removed and unrolled onto a primary roll to form a roll of primary quality material. As the web was rolled from the production roll to the primary roll it would be inspected. When secondary quality material was noted the web would be cut and the secondary quality material seamed to the free end of a secondary quality web attached to a secondary roll. The secondary quality material would be rolled upon the secondary roll until primary quality material was again noted, then the web would again be cut. The primary quality web would then be seamed to the free end of the primary quality web left from the initial cutting of the secondary quality web. Then the rolling of the primary quality material would be continued until secondary quality material was again noted. The previous operation produced an excessive amount of waste material.

Often the rolls that are produced are 10, 12, or 15 feet in width. It is thus quite obvious that handling the webs as described above has entailed large amounts of manpower and heavy equipment, such as power lifts. Also, it will be noted that the process of removing secondary quality material would be much more efficient if it could be conducted directly on the web as it comes from the production zone.

It is an object of the present invention to provide a method and apparatus for handling lengths of thermoplastic web which allows one to shift from rolling of a thermoplastic web on a primary roll to rolling of the thermoplastic web on a secondary roll or the reverse thereof so quickly that the shifting can be carried out on web as it is supplied from the production zone.

Another object is to provide a method and apparatus which substantially reduces the man-hours required for producing primary quality and secondary quality rolls of thermoplastic webs.

Still another object of the present invention is to provide a method and apparatus which allows the production of primary quality and secondary quality rolls of thermoplastic web with a minimum of waste material produced during the shifting or transfer of the roll up of the thermoplastic web between one roll and the other roll.

Other objects, aspects and advantages of the invention will be apparent after further study of this specification, the drawings, and the appended claims.

In accordance with the present invention an improvement in the forming of rolls of a thermoplatic web is provided by a method of quickly shifting the roll upon which the web will be rolled comprising, providing for a first thermoplastic web from a source of supply to be connected to a first roll means in such a manner that said first thermoplastic web lies outside a pair of spaced apart clamping means, providing for a second thermoplastic web which passes from a second roll to a securement means in such a manner that said second thermoplastic web passes between said spaced apart clamping means, directing a portion of said first thermoplastic web between said clamping means with a web shifting means in such a manner that said first thermoplastic means overlaps said second thermoplastic web, clamping the overlapped webs between one of said clamping means and said web shifting means, passing a melting means through the clamped overlapped webs in such a manner as to sever each web and bond the severed ends of said second web to the adjacent ends of said first web to form first and second seams, allowing the seams to cool until they have sufficient strength to withstand the rolling process, and then releasing the clamping force between the clamping means and the web shifting means.

Further, in accordance with the present invention there is provided an apparatus for handling lengths of thermoplastic web which allows quick shifting from rolling upon one roll to rolling upon another roll, said apparatus comprising, a pair of spaced-apart clamping means each having a clamping face and a web guiding surface, a primary roll means for receiving thermoplastic web from a source of supply and forming a primary roll of said thermoplastic web, said primary roll means being positioned relative to said spaced-apart clamping means such that when thermoplastic web is directed thereto from said source of supply said thermoplastic web will lie outside said spaced-apart clamping means, a secondary roll means for receiving a thermoplastic web from a source of supply and forming a secondary roll of said thermoplastic web, said secondary roll means being positioned relative to said spaced-apart clamping means such that when thermoplastic web is directed thereto from said source of supply said thermoplastic web will lie outside said spaced-apart clamping means in a position opposite that in which said web will lie when supplied to said primary roll means from a source of supply, a web securement means for securing one end of a thermoplastic web having its other end connected to either a primary roll or said secondary roll on said respective primary or secondary roll means, said web securement means being positioned such that a thermoplastic web attached to either said primary or said secondary roll and to said web securement means will pass between said spaced apart clamping means and over a respective one of said clamping means on a side opposite the side on which the web securement means is positioned, web shifting means for shifting a portion of a first thermoplastic web which is positioned outside said spaced-apart clamping means as a result of being directed from said source of supply to either said primary or secondary roll means to a position between said spaced-apart clamping means so as to overlap a second thermoplastic web passing between said spaced-apart clamping means as a result of being directed from said web securement means to the other of said primary and secondary roll means, activator means for shifting at least one of said clamping means so as to clamp overlapped first and second thermoplastic web portions between a clamping means and said web shifting means, and melting means which is capable of being passed through the overlapped portion of first and second thermoplastic web clamped between a respective clamping means and said web shifting means so as to sever each web and bond the severed ends of said first thermoplastic web to the severed ends of the second thermoplastic web to provide first and second seams.

A further understanding of the present invention will be provided by reference to the accompanying drawings wherein.

In the figures like features are given like numbers.

Figure 1:
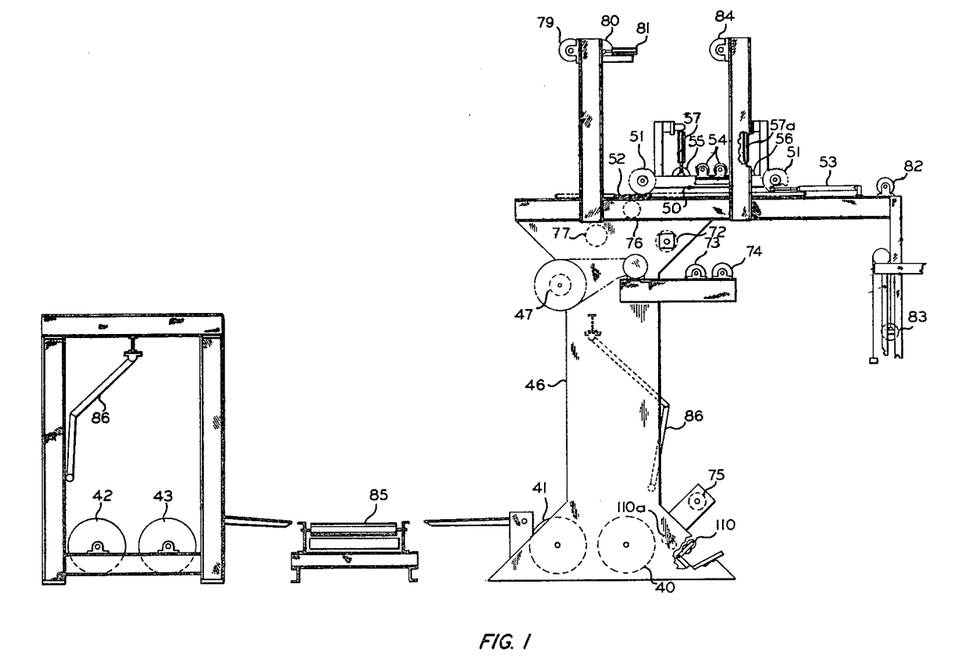
FIG. 1 is a side elevational view of an apparatus representing one embodiment of the present invention.

The apparatus illustrated in FIG. 1 includes a primary roll means comprising a pair of spaced apart rolls 40 and 41 which are driven by a motor (not shown). Also included is a secondary roll means comprising another pair of spaced apart rolls 42 and 43 which are driven by a motor (again not shown). Both the primary and secondary roll means are adapted to receive a thermoplastic web from a source of supply and roll the web material to form primary and secondary rolls of the thermoplastic web.

The apparatus further includes a frame 46. Attached to the frame above the primary roll means is a tension roll means 47 connected by a slip clutch to a driving motor 48. The slip clutch is adjusted such that the tension roll 47 will take up thermoplastic web only until the web is under a chosen amount of tension.

The upper portion of the frame includes a support 49 for a carriage 50. The carriage is movably supported on a pair of rotatable sprocket wheels 51 on each side. Each pair of sprocket wheels are connected by rotatable shafts 51a. The sprocket wheels 51 rotate along lenghts of chain 52 fixedly attached to the frame and adapted to serve as guides for the sprocket wheels 51 on both sides of the carriage 50. A double acting air cylinder 53 is attached to the carriage and to the frame in such a manner as to enable the carriage to be shifted horizontally from a first position to a second position. The term double-acting air cylinder as used herein is intended to denote that type of air cylinder in which air supplied at one point drives the air cylinder piston in one direction and in which air supplied at another point is employed to drive the air cylinder piston in the opposite direction. A solenoid valve (SOL1B), not shown, is provided for controlling the air necessary to cause the air cylinder to shift the carriage to the left. A solenoid valve (SOL1A), not shown, is provided for controlling the air necessary to cause the air cylinder to shift the carriage to the right. Preferably SOL1A and SOL1B are combined in a single double coil 4-way solenoid valve.

The carriage 50 includes a pair of spaced-apart guide rolls 54. On each side of the guide rolls there is attached to the carriage a web shifting pressure roll 55 and 56. Pressure roll 55 will be designated herein as the primary pressure roll and pressure roll 56 as the secondary pressure roll. The pressure rolls 55 and 56 are each attached to the carriage by way a pair of pivotably mounted double-acting air cylinders 57, 57a respectively. The air cylinders 57, 57a are adapted to cause the pressure rolls 55 and 56 to be reciprocated vertically. A solenoid valve (SOL2B), not shown, is provided for controlling the air necessary to force the secondary pressure roll 56 down. A solenoid valve (SOL2A), not shown, is provided for controlling the air necessary to force the secondary roll 56 up. Similarly solenoid valves SOL3B and SOL3A, again not shown, are provided for controlling respectively the downward and upward movement of the primary pressure roll 55. The pressure rolls 55 and 56 are covered with a layer of spirally wound asbestos fabric 105. The fabric that is wound is 2 inches wide and 0.5 inches thick.

Figure 2:
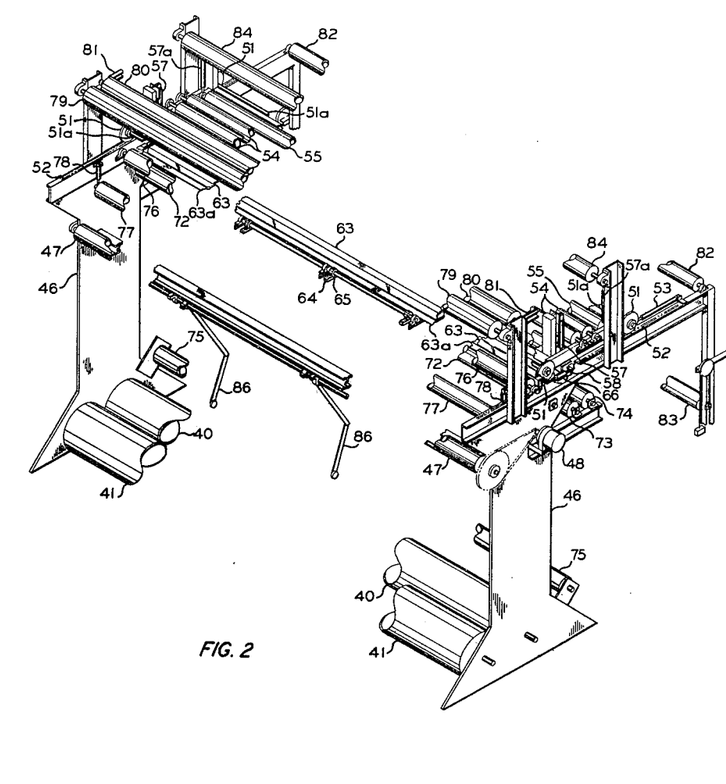
FIG. 2 is a fragmented pictorial view of portions of the primary roll-up and seaming portion of the apparatus of FIG. 1.
Figure 3:
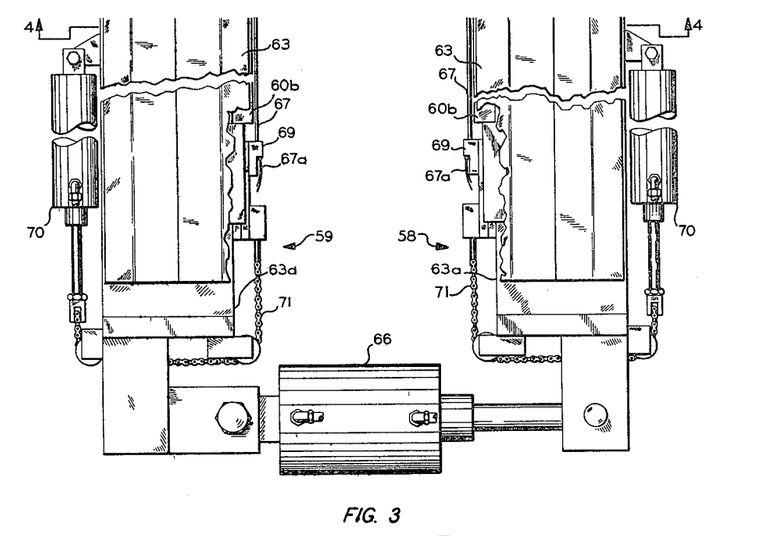
FIG. 3 is a partial top view of the clamping means of the apparatus of FIG. 1.
Figure 4:
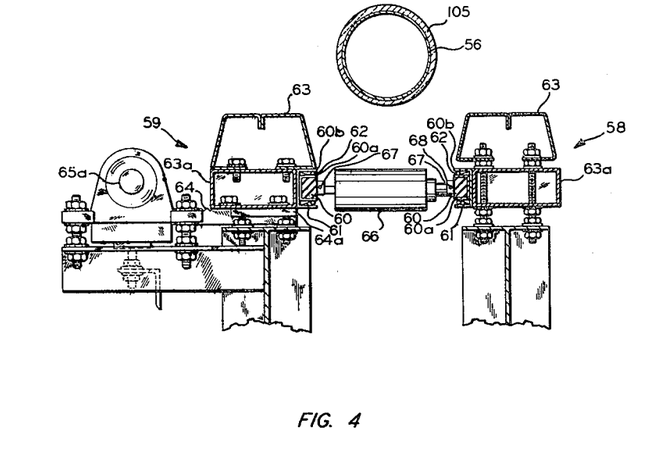
FIG. 4 is a cross-sectional side view of the clamping means of FIG. 3 as taken along lines 4—4 of FIG. 3.

Beneath the carriage there are a pair of spaced apart clamping means 58 and 59. This is best illustrated in FIGS. 2-4. The clamping face of clamping means each includes a resilient portion 60 formed of rubber secured in channel member 60a which is fixedly secured in channel member 60b which is fixedly secured to structural member 63a. The clamping face of each clamping means is covered with a heat resistant fabric 61 such as Teflon, i.e. a polytetrafluoroethylene fabric. The fabric can be of any thickness suitable for protecting the resilient means from being burned by the resistance wire, described below, during the cutting and seaming operation. The heat resistance fabric is secured in position around the resilient material by resilient pieces of surgical tubing 62 between channel members 60a and 60b. The top side of the clamping means includes a web guiding surface 63 formed of smooth metal.

The clamping means 58 is secured to the frame in a stationary position. The clamping means 59 is movably supported along its center portion by rack 64 and pinion 65 means. Rack 64 is fixedly attached to the bottom of structural member 63a of movable clamping means 59 while pinion 65 is rotatable with shaft 65a rotatably supported on the frame of the machine. Each end of the clamping means 59 is further connected to the respective end of clamping means 58 by a pair of double-acting air cylinders 66 which are secured to clamping means 58. Solenoid valve SOL4A and SOL4B, not shown, are provided for controlling the air for respectively opening and closing of the clamping means. Activation of the air cylinders 66 results in shifting of the air cylinders 66 and clamping means 59 relative to the stationary clamping means 58. The rack 64 and pinion 65 means assures that when the clamping means 59 is shifted, the movable clamping means 59 will move equally along its length to provide uniform pressure against either pressure roll and its clamping means 58.

Associated with the clamping face of each clamping means there is an electrical resistance element comprising a wire 67 under tension. One end of the wire 67 is secured to the clamping means by an insulated fastener block 68. The resistance wire can be any suitable wire. Generally a wire of about 12–18 gauge. A typical example is 14 gauge Chromel-D sold by Haskins Mfg. of Detroit, Mich. The other end of the wire is connected to a wire securement means such as an insulated block 69. The wire securement means 69 is in turn attached to an air cylinder 70 by means of a chain 71 in such a manner that the air cylinder 70 will keep the wire 67 under tension even when it is heated. The resistance wire elements 67 are connected by wire 67a to a source of electricity.

Figure 5:
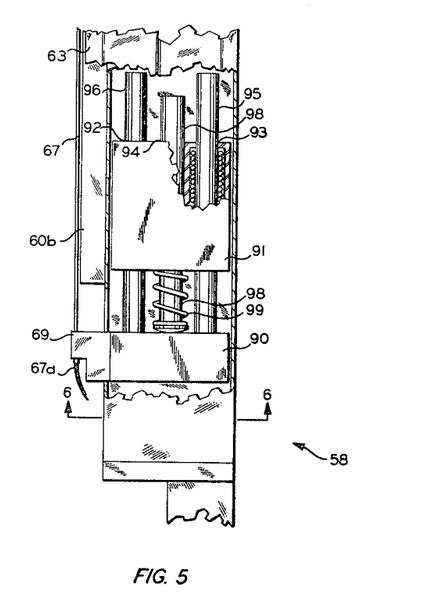
FIG. 5 is a fragmentary partial top view of one clamping means illustrating an alternate means for keeping tension on the resistance heating wire.
Figure 6:
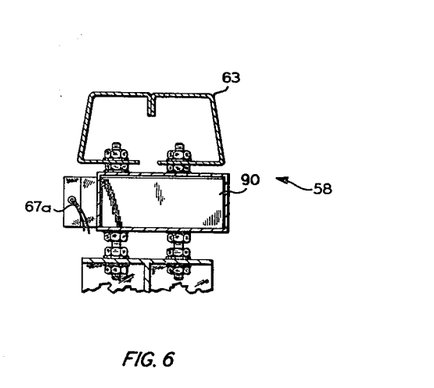
FIG. 6 is a cross-sectional side view of the clamping means of FIG. 5 taken along lines 6—6 of FIG. 5.

Other mechanical devices can be developed for maintaining the wire under tension. One alternative is illustrated in FIGS. 5 and 6. In this embodiment one end of the wire 67 is attached to an insulated fastener as in the earlier described embodiment, i.e. fastener 68. At the opposite end of the clamping means the wire is attached to the slide 90 of a slide and block mechanism. The block 91 has two opening 92 and 93 therethrough having recirculating linear ball bearings and a center borehole opening 94 aligned with the two openings. The slide 90 is a generally rectangular member having two spaced-apart rods 95 and 96 fixedly attached thereto for movement through the openings 92 and 93. An insulated member 69 is provided for attaching the wire to the slide. A pin 98 having a spring 99 positioned thereon is positioned for slidable movement within the center borehole 94 of the block 91 in such a manner that the spring 99 forces the slide away from the block and thus maintains tension on the wire.

Beneath the clamping means there is further secured to the frame guide rolls 72, 73, 74, and 75 and to one side of the moveable clamping means there is secured to the frame a guide roll 76. The guide rolls are freely rotatable. Still further to one side of the moveable clamping means there is a slack roll 77 secured to the frame by means of double acting air cylinders 78 at each end of the slack roll as best seen in FIG. 2. The slack roll is freely rotatable. The air cylinders 78 allow the slack roll 77 to be reciprocated vertically. Solenoid valves SOL5A and SOL5B, not shown, are provided for controlling the air for respectively the raising and lowering the slack roll.

The apparatus further includes secondary nip rolls 79 and 80 secured to the frame. One of the secondary nip rolls 80 is secured at each end of the frame by means of double acting air cylinders 81 which permit that roll to be reciprocated relative to the other 79. Solenoid valves SOL7A and SOL7B are provided for controlling the air for respectively closing and opening the nip rolls.

Dancer roll 83 and guide roll 82 are also associated with the apparatus. The dancer roll assures that web material from a source of supply when being rolled upon said primary or secondary roll means will be rolled under some tension to assure that smooth rolls of web material are produced. A quick roll 84 is positioned above the carriage 50.

Between the primary roll means 40 and 41 and the secondary roll means 42 and 43 there is located a conveying means 85 upon which primary or secondary rolls of web can be dumped for conveyance away from the apparatus for storage, shipping, etc.

The primary and secondary roll means each have associated therewith pivotable doffer arms 86 that can be moved to shift a roll of web lying upon the rolls to the conveyor. Optionally the apparatus can have associated therewith one or more slitter knives 110 which can be brought into contact with the web being rolled on the primary quality material roll 44 to permit the production of rolls of different widths. In FIG. 1 110a indicates the position of the slitter knives in position for slitting web material.

An explanation of how the apparatus can be operated to allow shifting from rolling a thermoplastic web upon one roll to rolling upon another roll will now be provided in connection wih the diagrammatical illustration in FIGS. 7–10.

Figure 7:
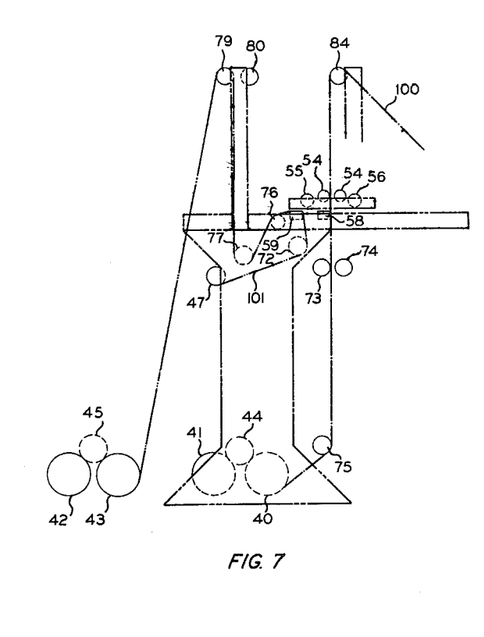
FIG. 7 is a diagrammatical side elevational view illustrating the position of various components for the rolling of the web upon a primary roll.

FIG. 7 illustrates the relative position of various elements of the apparatus for permitting the thermoplastic web from a source of supply (not shown) to be rolled upon a primary roll. The thermoplastic web 100 is directed between guide rolls 54, 73, 74 and around guide roll 75. The carriage is positioned such that the thermoplastic web passes to one side of the clamping means 58, 59. Also thermoplastic web from the secondary roll means is passed between the nip rolls 79, 80, under the slack roll 77, over guide roll 76, between the clamping means 58, 59, over guide roll 72, and to the tension roll 47. The slack roll 77 is in its extended downward position. The secondary rolls 42, 43 are not activated. With the elements so positioned the rolling of primary rolls 40, 41 will result in rolling up of the thermoplastic web 100 upon a primary roll 44. Once the thermoplastic web attached to the tension roll 47 is under a selected amount of tension the slip clutch (not shown) will slip so that no rolling of the web on the tension roll occurs.

Figure 8:
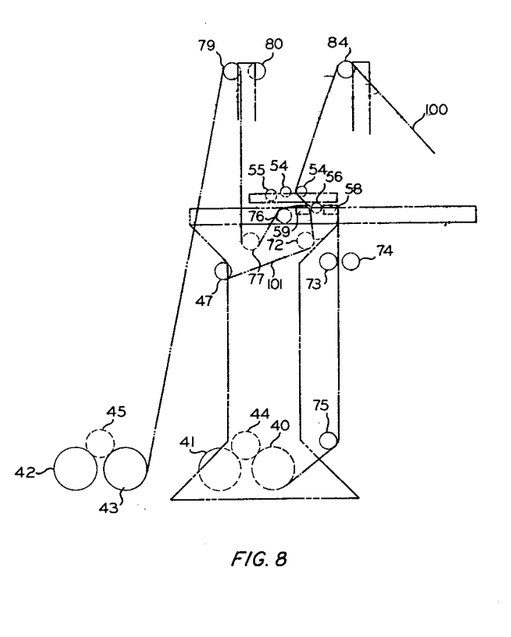
FIG. 8 is a diagrammatical side elevational view illustrating the position of various components for shifting from rolling on the primary roll to rolling on the secondary roll.

When it is desired to shift from rolling the web on the primary roll to rolling on the secondary roll 45, the primary rolls 40, 41 are deactivated. The carriage 50 is shifted to the left to its second position as shown in FIG. 8. The pressure roll 56 is extended downward to force a portion of the thermoplastic web 100 from the source of supply between the clamping rolls in an overlapping relationship with the thermoplastic web 101 connected to the tension roll 47. Then the movable clamping means 59 is shifted to clamp the overlapped webs between clamping means and the pressure roll 56. Simultaneous with shifting of the clamping means the slack roll 77 is raised such that there will be enough slack in the web to insure that the shifting of the clamping means 59 will not exert an undesired amount of stress upon the web 101. It is to be understood that the use of different mechanisms for shifting the clamping means can result in the elimination of the necessity of the slack roll.

The position of the elements of the apparatus at that point is illustrated in FIG. 8. The wire 67 adjacent clamping means 59 is then heated for a time sufficient to result in the cutting and seaming of the clamped overlapped web. After the cutting and seaming has been effected the wire 67 and the seam are then allowed to cool. When the seam has cooled enough to be secure the clamping means 59 and the slack roll 77 are shifted back to their initial position and the pressure roll 56 is raised. Upon the shifting of the clamping means 59, the tension roll 77 will take up the slack in the web 101 now attached to the primary roll 44.

Figure 9:
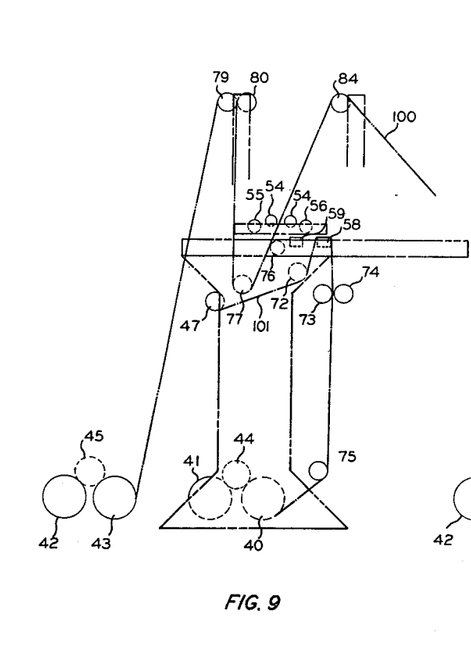
FIG. 9 is a diagrammatical side elevational view illustrating the position of various components for the rolling of the web upon a secondary roll.

Activation of the secondary rolls 42, 43 then results in the thermoplastic web 100 from the source of supply being rolled upon secondary roll 45. The position of the elements of the apparatus for roling the web upon the secondary roll 45 is illustrated in FIG. 9. When web 100 is being rolled upon the secondary rolls it is preferred that the nip rolls 79, 80 be closed so as to assure that the web will be rolled on the secondary roll 45 under tension. Primary roll 44 and secondary roll 45 are hollow paperboard tubes which serve as take up reels for the fabric.

Figure 10:
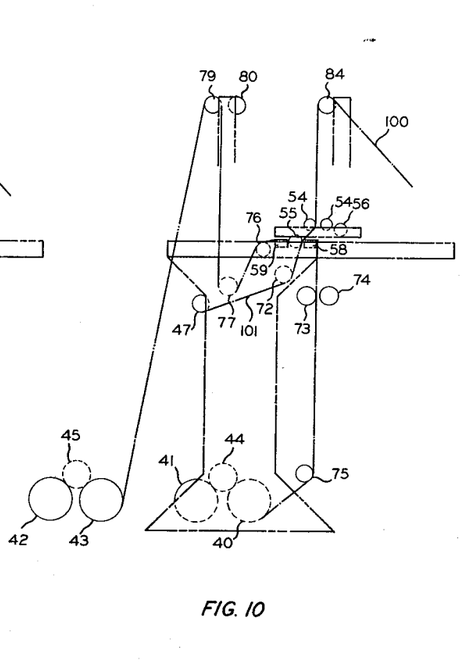
FIG. 10 is a diagrammatical side elevational view illustrating the position of various components for shifting from rolling web on the secondary roll to rolling web on the primary roll.

When it is desired to shift back from rolling the web 100 upon the secondary roll 45 to rolling the web upon the primary roll 44, the secondary rolls 42, 43 are deactivated. The carriage 50 is shifted back to the right as shown in FIG. 10. The primary pressure roll 55 is shifted down to overlap the thermoplastic web 100 provided from the source of supply and the thermoplastic web 100 attached to the tension roll 47. The movable clamping means 59 is then shifted to clamp the overlapped web between pressure roll 55 and clamping means 58. The position of the elements at that point is illustrated in FIG. 10. The wire 67 adjacent clamping means 58 is then heated for a time sufficient to result in the cutting and seaming of the clamped overlapped web. After the cutting and seaming has been effected the wire 67 and the seam are allowed to cool. When the seam has cooled enough to be secure the clamping means is shifted back to its initial position and the primary pressure roll 56 is raised. The position of the element of the apparatus at that point is as shown in FIG. 7. Accordingly reactivation of the primary rolls 40, 41 will result in again rolling the thermoplastic web 100 upon the primary roll 44.

Figure 11A:
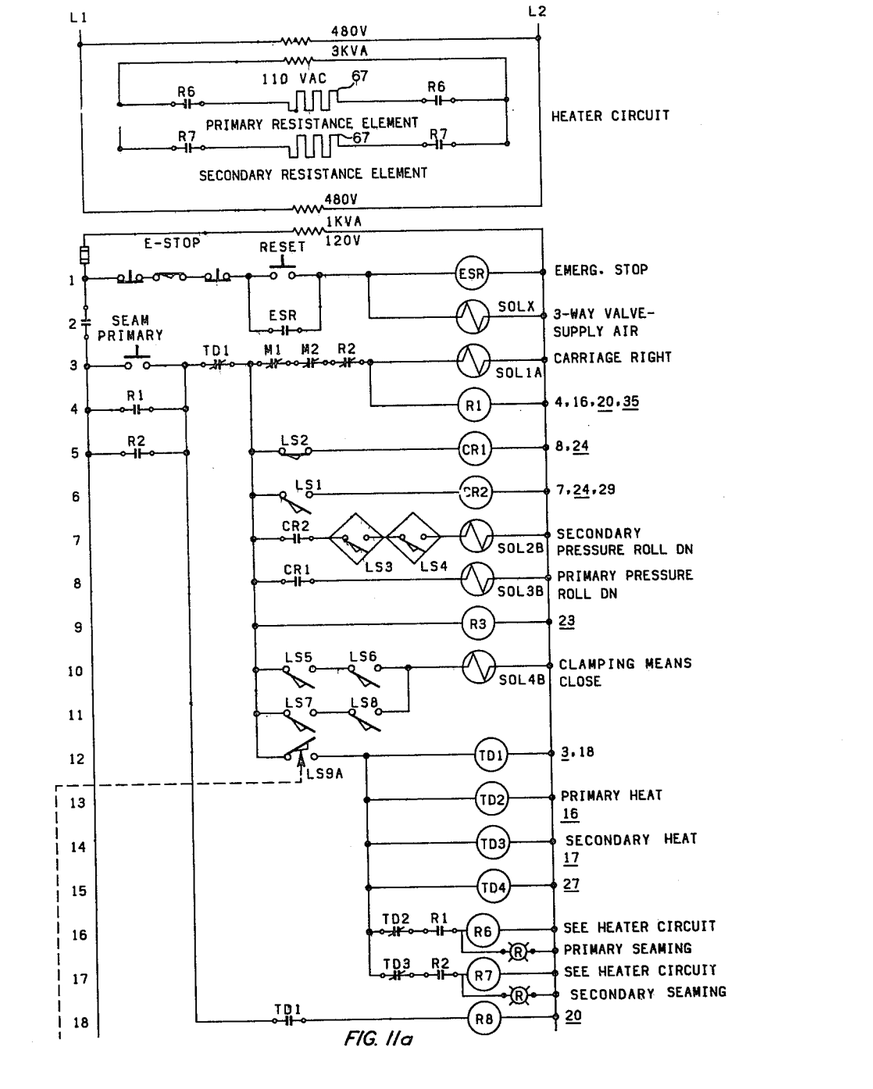
FIGS. 11a and 11b are schematic diagrams of an electrical circuit for a control system for controlling the apparatus of FIG. 1.
Figure 11B:
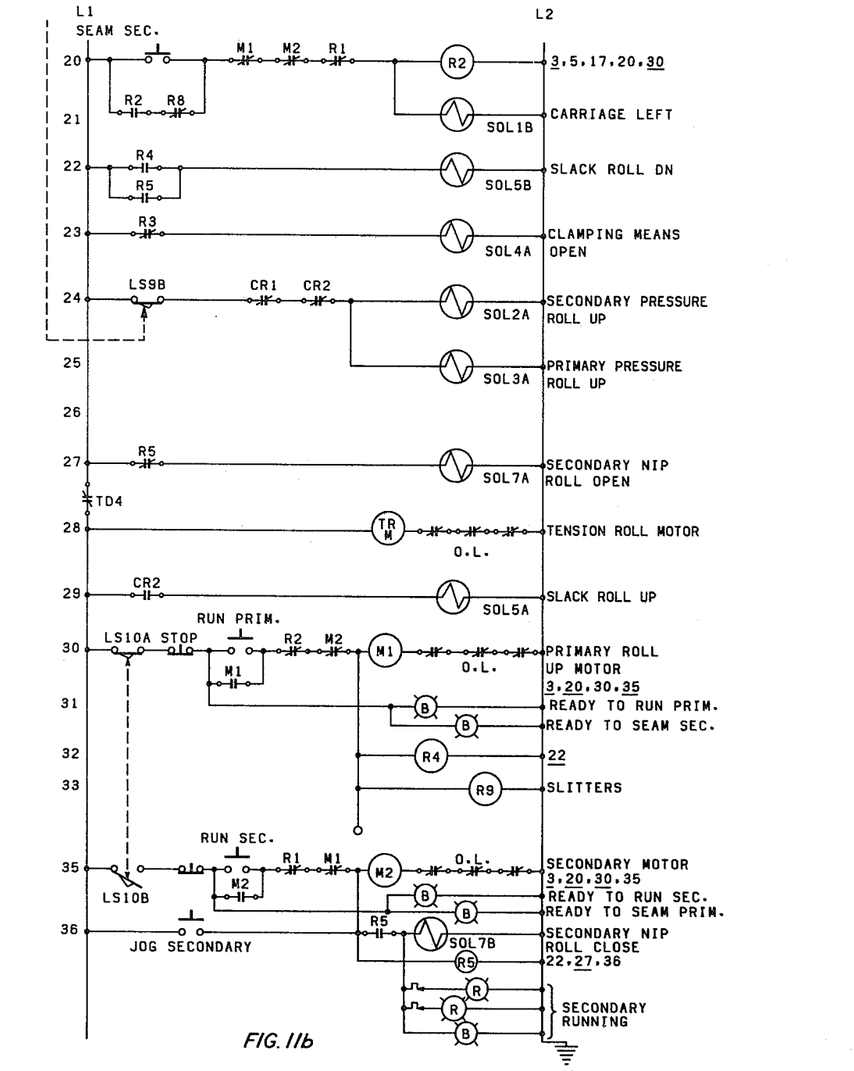

An electrical circuit for a control system for the apparatus of FIG. 1 as illustrated in FIGS. 11a and 11b will now be explained. In FIGS. 11a and 11b the vertical line on the left is the hot wire and the vertical line on the right is the ground wire. For aiding in the description the horizontal branch lines have been numbered along side the hot wire. It is to be noted that the circuit of FIG. 11b is a continuation of the circuit of FIG. 11a. The hot wire ending at the bottom of FIG. 11a is connected to the hot wire at the top of FIG. 11b. The ground wires of FIGS. 11a and 11b are similarly attached.

To the right of the ground wire indica are provided explanations of the function of certain lines of the circuit. In those cases where numbers are provided to the right of a relay the numbers refer to the lines in which there are contacts that are controlled by that relay. If the number has a line under it, such as 20 and 35 in line 4, that indicates that the contacts are normally closed until acted upon by the corresponding relay. The absence of a line under the numbers indicates that the contacts are normally open.

The circuit illustrated in FIGS. 11a and 11b includes a number of switches which are opened or closed by various portions of the apparatus. Switch LS1 is associated with the carriage such that it is open when the carriage is to the right and closed when the carriage is to the left. Switch LS2 is associated with the carriage such that it is open when the carriage is to the left and closed when the carriage is to the right. Switches LS3 and LS4 are associated with the slack roll cylinders 78 and are closed when the slack roll 77 is up and open when the slack roll 77 is down. Switches LS5 and LS6 are associated with the secondary pressure roll cylinders such that they are open when that roll is up and closed when that roll is down. Switches LS7 and LS8 are associated with the primary pressure roll cylinders such that they are open when the roll is up and closed when the roll is down. Switch LS9A is associated with the clamping means such that the switch is open when the clamping means are open and closed when the clamping means are closed. Switch LS9B is associated with the clamping means such that that switch is open when the clamping means are closed and closed when the clamping means are opened. Switch LS10A is associated with the carriage cylinder 53 such that the switch is open when the carriage is to the left and closed when it is to the right. Switch LS10B is associated with the carriage cylinder 53 such that the switch is closed when the carriage is to the left and open when it is to the right.

The circuit also includes a number of operator controlled switches (also called buttons herein). There is of course a master switch (not shown) for controlling electricity flow to the circuit. There is an emergency stop button in line 1. Also in line 1 there is located a reset button. In line 3 there is located a seam primary button which will be pushed when one wants to shift from rolling upon the primary roll 44. In line 20 there is a seam secondary button which will be pushed when one wants to shift from rolling upon the secondary roll 45. In line 30 there is a run primary button which will be pushed to activate rolling of web upon the primary roll 44. In line 35 there is located a run secondary button which will be pushed to activate rolling of web 100 upon the secondary roll 45.

The circuit further includes various colored lights which serve to continually indicate to an operator the stage of operation under which the apparatus is operating. The heater circuit is connected to the electrical source by one transformer. The remainder of the circuit is connected to another transformer. That is illustrated diagrammatically in FIG. 11a.

In the circuit illustrated the various switches are shown as they would be with power off and the carriage in the right position.

To operate the apparatus a master switch is closed to give power to the circuit. The operator pushes the reset button momentarily which applies power to the circuit and activates solenoid SOLX to provide air to all components which have open ports in the air directional control valves. The coil of the emergency stopping relay is also energizing closing a set of ESR contacts in the hot line between lines 1 and 3 and also closing ESR contacts which bypass the reset button. Power is applied to relay R4 to close contacts R4 in line 22 activating SOL5B providing air pressure to the slack roll cylinder to move the slack roll down. The carriage at that point is in the right position. The fabric from the process line is in the primary take up position. The fabric tail from the secondary roll 45 is seamed to the fabric tail from the tension roll 47. Relay TRM in line 28 closes contacts (not shown) to activate the tension roll motor 48. The control for the tension roll D.C. motor (not shown) is adjusted to maintain a constant taut tension on the fabric tails 101. The machine is now ready to take up primary quality material or to shift from primary take-up to seam for secondary quality.

To shift from primary quality material take-up to seam for secondary quality mode the seam secondary push button in line 20 is momentarily pushed energizing relay R2 to open the R2 contacts in lines 3 and 30 and close the R2 contacts in lines 5, 17 and 20. The opening of contacts R2 in line 3 deactivates solenoid valve SOL1A which provides pressure to the carriage cylinder 53 to maintain the carriage 50 in the right position. The same contacts also deactivate relay R1 in line 4. The closing of contacts R2 in line 5 provides power to the control circuits between lines 3 and 18 when the seam primary push button is open. The closing of the R2 contacts in line 17 permits the activation of relay R7 in line 17 when the clamping means 58, 59 close limit switch LS9A. The closing of contacts R2 in line 20 latch relay R2 into the circuit. Opening of the R2 contacts in line 30 deactivates the primary roll up motor relay M1 deactivating the primary roll up motor. Solenoid SOL1B line 21 is also energized extending the carriage cylinder 53 to move the carriage 50 to the left thus opening limit switch LS10A in line 30 and closing LS10B in line 35. The opening of limit switch LS10A deactivates relay R4 to open contacts R4 in line 22 deactivating solenoid valve SOL5B which when activated maintains pressure keeping the slack roll in cylinders 78 extended in the down position. Relay R9 in line 33 is also deactivated opening contacts (not shown) in the circuit to the slitter motors (not shown) to deactivate the slitters. The carriage movement to the left closes limit switch LS1 in line 6 energizing the coil of relay CR2 which closes the CR2 contacts in lines 7 and 29 and opens the CR2 contact in line 24. The opening of CR2 in 24 deactivates solenoid valves SOL2A and SOL3A which when activated provide air pressure to hold the pressure rolls 55, 56 in the up position. The closing of the CR2 contacts in line 29 activates SOL5A to retract slack roll cylinders 78 and the slack roll 77. The retraction of the slack roll 77 closes limit switches LS3 and LS4 activating solenoid valve SOL2B in line 7 to provide air pressure to extend the secondary roll air cylinders 57a to move the secondary pressure roll 56 to the down position. The movement of the secondary pressure roll 56 to the down position closes limit switches LS5 and LS6 line 10 energizing solenoid valve SOL4B to retract the clamping means air cylinders 66 and close the clamping means 58, 59 against the fabric and secondary pressure roll 56. Since relay R3 in line 9 is energized the contacts R3 in line 23 are open deactivating solenoid valve SOL4A which when activated provides pressure to the clamping means cylinders 66 to hold them in the open position. Movement of the clamping means 58, 59 closes limit switch LS9A and opens limit switch LS9B starting the main timer TD1 in line 12 (running time about 30 seconds). TD1 is an interlocking timer having a timing period greater than the other timers TD2, TD3, and TD4 which start timing simultaneously with TD1. Since relay R2 in line 20 has been activated and the contacts R2 in line 17 are closed relay R7 in line 17 is activated energizing the secondary heating element wire 67 adjacent the moveable clamping means 59 until timer TD3 times out and the contacts TD3 in line 17 are opened to dactivate the relay R7 and the heating of the wire 67 after a sufficient period for seaming. The seaming step fuses the fabric end from the secondary roll up roll 45 to the fabric 100 from the process line and the tail 101 from the tension roll to the primary roll up roll 44. Timer TD4 opens contacts TD4 in the hot line between lines 27 and 28 during the seaming operation to deactivate the primary and secondary roll up motors and the tension roll motor 48. Contacts TD4 close at the end of the seaming cycle as timer TD4 times out. When timer TD1 times out contacts TD1 in line 3 open momentarily deactivating relay R3 in line 9 and all solenoid valves and relays in the seaming circuit and closes contacts R3 in line 23 to activate solenoid valve SOL4A which controls the air pressure to the clamping means air cylinders 66 to open the clamping means 58, 59. Opening of the clamping means 58, 59 opens limit switch LS9A and closes LS9B activating solenoid valve SOL2A to provide air pressure to the secondary pressure roll air cylinders 57a to move the secondary pressure roll 56 to the up position. Contacts TD1 in line 18 close momentarily activating relay R8 to open contacts R8 in line 20 deactivating relay R2 and allowing timer TD1 to reset. Since the movement of the carriage 50 to the left closed limit switch LS10B in line 35, the machine is now ready to run secondary quality material or to shift from secondary running position to seam primary position.

To run in the secondary mode the run secondary push button of line 35 is momentarily pushed energizing relay M2 in line 35 latching to a closed position contacts M2 in line 35 and starting the secondary roll up motor (not shown). The M2 contacts in line 30 are opened deenergizing relay M1 to prevent the primary roll up motor from running. The M2 contacts in lines 3 and 30 are opened to prevent the carriage 50 from moving to the right. Simultaneously relay R5 in line 36 is energized closing contacts R5 in line 22 activating solenoid valve SOL5B providing air pressure to extend the slack roll cylinders 78 to force the slack roll 77 down. Contacts R5 in line 36 are also closed energizing solenoid valve SOL7B to provide air pressure to extend the secondary nip roll air cylinders 81 to cause the secondary nip rolls 79, 80 to close to nip the fabric.

If desired, the secondary quality material can be jogged before the start of secondary running by pushing the jog secondary push button switch of line 36 activating relay R5 to latch to a closed position contacts R5 in line 36 and activating solenoid valve SOL7B in line 36 to extend the secondary nip roll air cylinders 81 to nip the fabric. Contacts R5 in line 22 are then also closed to energize solenoid SOL5B to provide air pressure to extend the slack roll 77 to the down position. Closing the jog secondary push button momentarily also activates relay M2 to energize the secondary roll up motor momentarily jogging the fabric.

To shift from secondary running to the seam primary mode the seam primary push button of line 3 is momentarily pushed energizing relay R1 in line 4 which closes the R1 contacts in lines 4 and 16 and opens the R1 contacts in line 20 deenergizing solenoid SOL1B and opens contacts R1 in line 35 of the secondary roll up motor circuit stopping the secondary quality material roll up. Solenoid SOL1A in line 3 is also energized retracting the carriage air cylinder 53 to move the carriage 50 to the right thus closing contacts LS10A in line 30 and opening contacts SL10B in line 35. The carriage movement to the right closes the limit switch LS2 of line 5 energizing the coil of relay CR1 which closes the CR1 contacts in line 8 and opens the CR1 contacts in line 24 deactivating solenoid valves SOL2A and SOL3A which provide air pressure to retract the primary pressure roll in cylinders 57 to hold the primary pressure roll 55 in the up position. The closing of the CR1 contacts in line 8 activates solenoid SOL3B providing air pressure to extend the primary pressure roll air cylinders 57 to move the primary pressure roll 55 to the down position. The movement of the primary pressure roll 55 to the down position closes limit switches LS7 and LS8 of line 11 energizing solenoid valve SOL4B to retract the clamping means air cylinders 66 and close the clamping means against the fabric and primary pressure roll 55. Since relay R3 in line 9 is energized contacts R3 in line 23 are open deactivating solenoid valve SO44A which when activated provides air pressure to the clamping means cylinders 66 to hold them in the open position. Movement of the clamping means 58, 59 in turn closes limit switch LS9A of line 12 and opens limit switch LS9B of line 24 starting the main timer TD1 and also starting the other timers TD2, TD3, and TD4 which start timing simultaneously. Since relay R1 has been activated and the contacts R1 in line 16 are closed relay R6 is activated energizing the heating of the primary heating element wire adjacent the material at the primary clamping means 59 until timer TD2 times out. Then the contacts TD2 in line 16 are opened to deactivate the relay R6 and the heating of the heating element wire 67 after a sufficient period of time for seaming. The seaming step fuses the fabric end from the primary roll up roll to the fabric end from the process line 100 and the tail 101 from the tension roll to the secondary roll-up roll 45. Timer TD4 opens contacts TD4 in the hot line between lines 27 and 28 during the seaming operation to deactivate the primary and secondary roll up motors and the tension roll motor 48. Contacts TD4 close at the end of the seaming cycle as timer TD4 times out. When timer TD1 times out contacts TD1 in line 3 open momentarily deactivating relay R3 of line 9 and all solenoid valves and relays in the seaming circuit and closes contacts R3 in line 23 to activate the solenoid valve SOL4A which controls the air pressure to extend the clamping means air cylinders 66 to open the clamping means 58, 59. Opening of the clamping means 58, 59 opens limit switch LS9A and closes LS9B activating solenoid valve SOL3A providing air pressure to retract the primary pressure to move the primary pressure roll 55 to the up position. Contacts TD1 in line 18 close momentarily activating relay R8 to open contacts R8 in line 20 deactivating relay R2 allowing the TD1 timer to reset. The machine is now ready to run primarily quality material or to seam back to secondary mode.

To run in the primary mode the run primary push button is pushed momentarily activating relay M1 in line 30 to latch in contacts M1 in line 30 and energize the primary roll up motor. Contacts M1 in line 35 are opened to prevent the secondary roll up motor from operating. The M1 contacts in lines 3 and 20 are opened to prevent the carriage 50 from moving. Optionally relay R9 in line 33 is energized to close contacts (not shown) to operate the slitter motors when the main power switch (not shown) to the motor is closed. Relay R4 in line 32 is energized to open contacts R4 in line 22 to deenergize solenoid valve SOL5B to release the air pressure on the slack roll cylinders 78.

Although the present invention has been illustrated in regard to a specific embodiment employing certain specific structures and mechanical devices, it will be understood that variations and modifications may be made without departing from the spirit of the invention. The scope of which is defined by the following claims.

What is claimed is:

1. In the forming of rolls of a thermoplastic web a method of quickly shifting the roll upon which the web will be rolled comprising, providing for a first thermoplastic web from a source of supply to be connected to a first roll means in such a manner that said first thermoplastic web lies outside a pair of spaced apart clamping means, providing for a second thermoplatic web which passes from a second roll to a securement means in such a manner that said second thermoplastic web passes between said spaced apart clamping means, directing a portion of said first thermoplastic web between said clamping means with a web shifting means in such a manner that said first thermoplastic web overlaps said second thermoplastic web, clamping the thus overlapped webs between one of said clamping means and said web shifting means, passing a melting means through the clamped overlapped webs in such a manner as to sever each web and bond the severed ends of said second web to the adjacent ends of said first web to form first and second seams, allowing the seams to cool until they have sufficient strength to withstand the rolling process, and then releasing the clamping force between the clamping means and said web shifting means.

2. A method according to claim 1 wherein said first and second thermoplastic webs are nonwoven fabrics produced from thermoplastic fibers.

3. A method according to claim 2 wherein said thermoplastic fibers are of staple length.

* * * * *